UNITED STATES PATENT OFFICE.

RUDOLF UHLENHUTH, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF PRODUCING AMINO-ANTHRAQUINONES.

1,104,943.  Specification of Letters Patent.  Patented July 28, 1914.

No Drawing.  Application filed June 2, 1913.  Serial No. 771,331.

*To all whom it may concern:*

Be it known that I, RUDOLF UHLENHUTH, Ph. D., chemist, a citizen of the Empire of Germany, residing at Höchst-on-the-Main, Germany, have invented certain new and useful Improvements in the Process of Producing Amino-Anthraquinones, of which the following is a specification.

My present invention relates to the preparation of amino-anthraquinones and substitution products thereof. It is known that, if these bodies are prepared, according to the method of von Perger (see *Berichte* vol. 12 (1879) pages 1419 and 1567 and British Patent No. 13,808/1903), by heating an alkali salt of an anthraquinonesulfonic acid with ammonia, the reaction only partly takes place according to the equation:

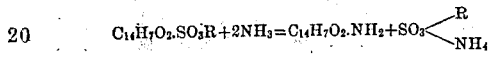

wherein R means an alkali metal, like potassium, or sodium, or the ammonium group; the salts of sulfurous acid thus formed causing the production of by-products which are not capable of transformation into the said amino-anthraquinones. According to British Patent No. 21,710 of 1911 it is therefore advantageous to perform the reaction in presence of an oxidizing agent capable of removing the sulfurous acid.

Now I have found that the sulfurous acid produced by the above-mentioned process can be transformed during the operation into a salt which is so little soluble that it no longer impedes the further reaction. In this way excellent results are obtained, particularly by employing the barium salts of the anthraquinonesulfonic acids in question, or by causing the formation of said salts during the reaction by the use of alkaline salts of said anthraquinonesulfonic acids and of soluble barium salts of suitable acids, such, for instance, as barium chlorid.

The following examples illustrate my invention:

Example I: 4.12 parts of finely powdered sodium anthraquinone-2-sulfonate are introduced into a solution of 2.36 parts of crystallized barium chlorid in 3.1 times as much water, and after having added 20.5 liters of aqueous ammonia of 25 per cent. strength this mixture is heated for 48 hours under pressure to 170–177° C. The resulting mass, after having been cooled, is filtered off and extracted by consecutively boiling with water, diluted hydrochloric acid and a diluted solution of sodium carbonate. Thus there are obtained 2.19 parts of pure crystallized 2-aminoanthraquinone=53.1% of the sodium salt used, or 73.7% of the theoretical quantity. When working under the foregoing conditions but without adding barium chlorid, the yield in 2-aminoanthraquinone does not exceed 50 per cent. of the theoretical quantity.

Example II: 3 parts of potassium anthraquinone 1-sulfonate are stirred into a solution of 2.25 parts of crystallized barium chlorid in 27 parts of aqueous ammonia of 25 per cent. strength and 3 parts of water, whereupon the mixture is heated for 12 hours to 180–186° C. at a pressure of about 40 atmospheres. The further operation is conducted in the manner indicated in Example I. The yield in pure crystallized 1-aminoanthraquinone amounts to 89% of the theoretical quantity. If the operation is conducted under the above indicated conditions but without adding barium chlorid, the yield in 1-aminoanthraquinone amounts only to 55%. When using another acid, for instance the 1.5— or 1.8— anthraquinonedisulfonic acid, the procedure is the same as that indicated in the foregoing examples.

Having now described my invention what I claim is:

1. The process for producing amino-anthraquinones, which consists in heating an anthraquinonesulfonic acid with aqueous ammonia in such a manner that the sulfurous acid produced by the reaction is transformed into a practically insoluble metallic salt.

2. The process for producing aminoanthraquinones, which consists in heating an alkali salt of anthraquinone sulfonic acid with aqueous ammonia in presence of a soluble barium salt.

3. The process for producing aminoanthraquinones, which consists in heating an alkali salt of anthraquinone sulfonic acid with aqueous ammonia in presence of barium chlorid.

In testimony whereof, I affix my signature in presence of two witnesses.

RUDOLF UHLENHUTH.

Witnesses:
JEAN GRUND,
CARL GRUND.